(12) United States Patent
Daly et al.

(10) Patent No.: US 8,285,694 B1
(45) Date of Patent: Oct. 9, 2012

(54) DISTRIBUTION OF ENTERPRISE RELATED ALERTS VIA THE EMERGENCY ALERT SYSTEM

(75) Inventors: Brian Kevin Daly, Seattle, WA (US); DeWayne Allan Sennett, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 448 days.

(21) Appl. No.: 11/624,508

(22) Filed: Jan. 18, 2007

Related U.S. Application Data

(60) Provisional application No. 60/829,786, filed on Oct. 17, 2006.

(51) Int. Cl.
G06F 7/00 (2006.01)
G06F 17/30 (2006.01)
(52) U.S. Cl. .................................................. 707/705
(58) Field of Classification Search .................. 707/705, 707/999.107
See application file for complete search history.

(56) References Cited

U.S. PATENT DOCUMENTS

| | | | |
|---|---|---|---|
| 6,944,621 B1 * | 9/2005 | Collart | 1/1 |
| 7,174,005 B1 * | 2/2007 | Rodkey et al. | 379/88.12 |
| 7,356,389 B2 * | 4/2008 | Holst et al. | 701/3 |
| 7,362,852 B1 * | 4/2008 | Rodkey et al. | 379/88.12 |
| 2004/0006694 A1 * | 1/2004 | Heelan et al. | 713/168 |
| 2006/0152355 A1 * | 7/2006 | Suenbuel et al. | 340/511 |
| 2006/0206568 A1 * | 9/2006 | Verma et al. | 709/206 |
| 2006/0217110 A1 * | 9/2006 | Othmer | 455/414.1 |
| 2006/0253582 A1 * | 11/2006 | Dixon et al. | 709/225 |
| 2007/0136743 A1 * | 6/2007 | Hasek et al. | 725/33 |
| 2007/0156456 A1 * | 7/2007 | McGillin et al. | 705/2 |
| 2007/0206773 A1 * | 9/2007 | Branam | 379/265.09 |

OTHER PUBLICATIONS

AtHoc, "Enterprise Notification Suite," ( http://web.archive.org/web/20051224011920/http://www.athoc.com/AtHocSite/products/), Dec. 24, 2005, 1-29.*

* cited by examiner

*Primary Examiner* — Aleksandr Kerzhner
(74) *Attorney, Agent, or Firm* — Woodcock Washburn LLP

(57) ABSTRACT

Enterprise related alert messages are distributed via the Emergency Alert System (EAS). The enterprise community (e.g., a company, a business, or a firm, a school, a corporation, a department of transportation, a law enforcement agency, commuter service, or the like) is provide the ability to distribute enterprise related information via the EAS. Enterprise related alerts can be generated automatically, semi-automatically, and/or manually. Enterprise related alerts can be used to notify TV and radio broadcasters.

18 Claims, 7 Drawing Sheets

DISTRIBUTION OF ENTERPRISE RELATED ALERTS VIA THE EMERGENCY ALERT SYSTEM

CROSS REFERENCE TO RELATED APPLICATIONS

The present application claims priority to U.S. Provisional Patent Application No. 60/829,786 entitled "SYSTEM AND METHOD FOR ENTERPRISE INITIATED ALERTS," filed Oct. 17, 2006, which is hereby incorporated by reference in its entirety.

TECHNICAL FIELD

The technical field generally relates to communications systems and more specifically relates to distributing enterprise related information via the Emergency Alert System (EAS).

BACKGROUND

Typically, an enterprise, such as a company, business, or firm, relies on radio and/or TV news reporting capabilities to provide urgent enterprise related information (e.g., "Plant closed due to snow conditions. Do not report to work") to its employees. For example, if an enterprise such as a manufacturing plant, a refinery, a school, a government office, or private business office, or the like, were closing due to an incident (e.g., a fire, a chemical spill, a bomb threat), the enterprise would rely on TV and/or radio broadcasts to inform its employees (not currently at the enterprise) of the closing. In many scenarios, the broadcaster would not interrupt its regular programming. Rather, the broadcast would report the incident during the next scheduled news break. This could result in a significant delay in the delivery of the information.

The enterprise could try to contact employees via telephone. For example, managers could call employees, who would in turn call other employees. This mode of telephone distribution also could be time consuming, inefficient, and result in a significant delay in the delivery of information. Further delay or failure to deliver the message could occur if there is a break in the chain because one of the intermediate persons in the process were not available.

SUMMARY

The Emergency Alert System (EAS) is utilized to deliver urgent non-EAS qualifying alerts for enterprise sites (e.g., manufacturing plants, refineries, schools, government offices, private business offices). Because EAS messages have priority over enterprise based alert messages, information will be delivered more quickly and with a higher likelihood of reception as compared to radio broadcasts, TV broadcast, and telephone distribution. Enterprise related alerts can be generated automatically, semi-automatically, and/or manually.

BRIEF DESCRIPTION OF THE DRAWINGS

The foregoing and other objects, aspects and advantages of distribution of enterprise related alerts via the Emergency Alert System (EAS) will be better understood from the following detailed description with reference to the drawings.

DETAILED DESCRIPTION OF ILLUSTRATIVE EMBODIMENTS

Figure 1:
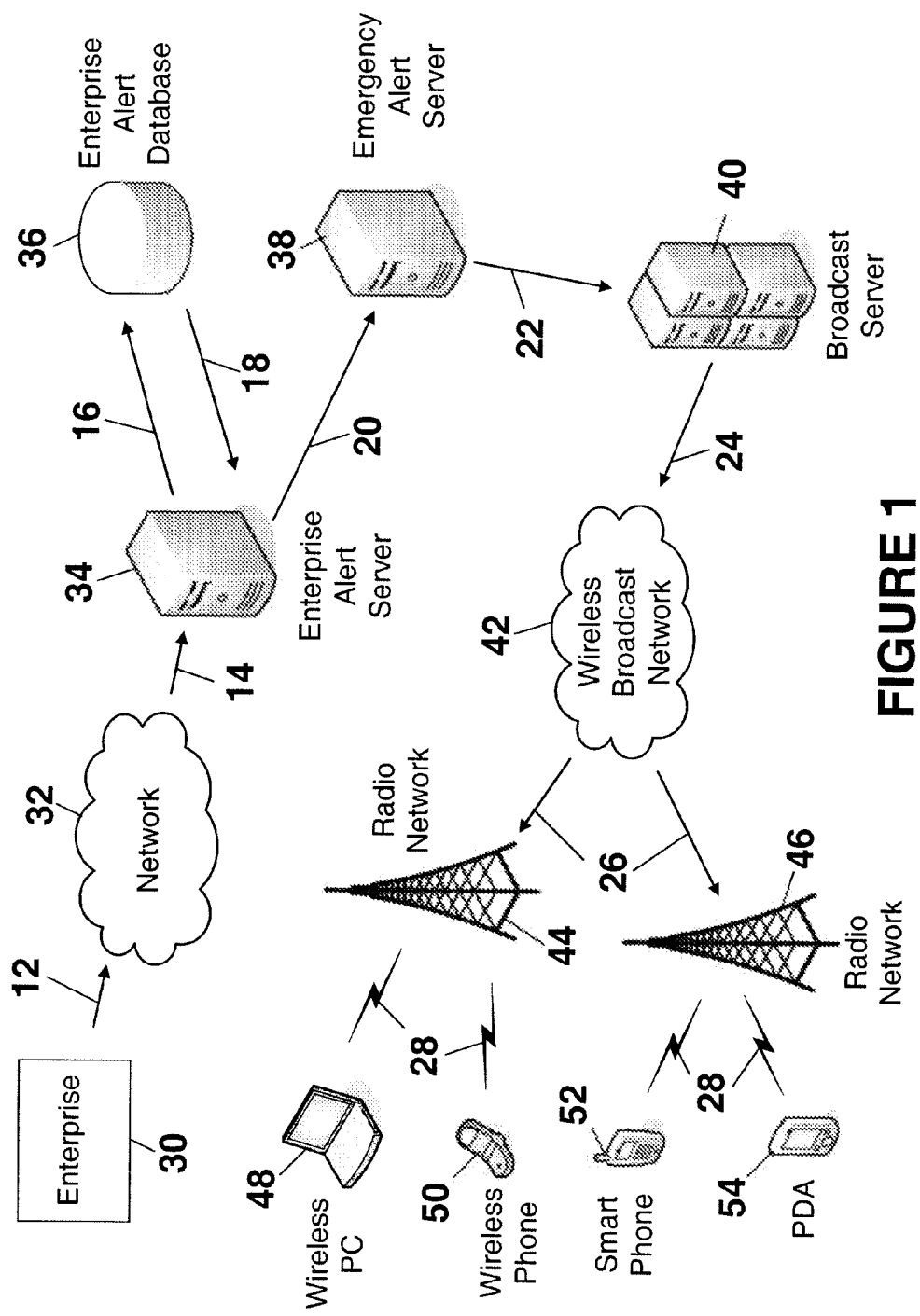
FIG. 1 is a flow diagram of an example system and process for distributing enterprise related alerts via the EAS.

The Emergency Alert System (EAS) is intended to provide notification to the public of imminent threats to public safety or property. Systems and methods are described herein that provide the enterprise community (e.g., a company, a business, or a firm, a school, a corporation, a department of transportation, a law enforcement agency, commuter service, or the like) the ability to distribute enterprise related information via the Emergency Alert System (EAS). The EAS can be utilized to deliver a message quickly and efficiently to parties, such as those directly affected (e.g., enterprise employees), and those who receive secondary impacts of the event (e.g., bus and train commuter services, law enforcement, departments of transportation) for example. Enterprise related alerts can be generated automatically, semi-automatically, and/or manually. Enterprise related alerts can be used to notify TV and radio broadcasters. Distribution of enterprise related alerts via the EAS is more reliable and more secure than delivery via pagers, telephone, or the like. Intended recipients of an enterprise related alert can receive information when not able to receive radio or TV broadcasts (e.g., en route to the enterprise). Warning an individual while en route provides the individual the opportunity to change direction, which can in turn reduce the potential for traffic congestion and gridlock conditions at or near the affected enterprise facility. Status updates are providable.

To illustrate the applicability of distributing enterprise related alerts via the EAS, two example scenarios are described. In the first example scenario, a large manufacturing company is building a major extension to a local plant. Less than 60 minutes prior to the start of the second shift at the local plant, construction activities accidentally damage the water main to the plant. Because there is no water at the plant, and to facilitate repair activities, the local plant is immediately closed. The second shift personnel need to be told not to report for work. Because this event is not an imminent threat to public safety or the public, it does not qualify as an EAS alert. But, an alert message needs to be delivered immediately to the local plant second shift personnel and other appropriate agencies or personnel such as corporate headquarters, local department of transportation, law enforcement agencies, bus and train commuter service agencies, or the like. Because this event occurred shortly before the start of the second shift, most of the large number (e.g., thousands) of workers of the local plant second shift are already en route to the plant. Consequently, announcements via televisions or via telephones from managers and shift supervisors will not be effective. Also there is no guarantee that the announcements will be carried by the local radio stations or that the announcements would be heard by the plant workers.

The second example scenario involves school closings. Currently, a notification of a school closure due to weather conditions or the like is accomplished via TV and/or radio broadcasts, and in some communities, via the telephone. If a school closure occurs during the school day, many working parents of the children attending the school may not receive the notification because TV and radio broadcasts are not generally available in the work place. In this example scenario, the school system is considered an enterprise and enterprise related alerts pertaining to the school closing can be provided via the EAS to notify parties such as parents, bus drivers, and crossing guards, for example, that there will be an early school closure.

FIG. 1 is a flow diagram of an example system and process for distributing enterprise related alerts via the EAS. An enterprise related alert message is a version of an EAS alert message that supports enterprise alerts. The enterprise related alert message comprises parameters and information needed for compatibility with the EAS. The enterprise related alert message also comprises enterprise specific information that a mobile device and/or any other receiving device can use to recognize and select the appropriate enterprise related alert message. Enterprise specific information can include an enterprise name, an enterprise identifier, an enterprise facility location identifier, and an enterprise alert type for example. An enterprise alert type can include any alert type indicating that enterprise operations are effected. For example, alert types can indicate that enterprise hours of operation are effected (e.g., open early, open late, close early, close late), that enterprise is being shut down for a period of time, that only specific personnel are to report to work, or the like.

At step 12, an enterprise related alert is provided to the network 32. The enterprise related alert is initiated by the enterprise 30. As described in more detail below, the enterprise related alert can be initiated manually, automatically, and/or semi-automatically. An enterprise can comprise any appropriate person and/or organization. For example, the enterprise 30 can comprise a company, a business, or a firm, a school, a corporation, a department of transportation, a law enforcement agency, a commuter service, or the like, or a combination thereof.

The network 32 can comprise any appropriate network, such as a wired and/or wireless network, for example. The enterprise related alert is provided, via the network 32, to the enterprise alert server 34 at step 14. At step 16, the enterprise alert server 34 requests an alert area or alert areas from the enterprise alert database 36. An alert area is an area to which the enterprise related alert message is to be provided and/or a group to which the enterprise related alert message it to be provided.

In response to the request for an alert area, or alert areas (at step 16) the enterprise alert database 36 provides to the enterprise alert server 34, at step 18, the alert area, or alert areas, associated with the type of alert and the location, or locations, of the enterprise 30. An alert area can be defined by any appropriate means. For example, an alert area can be defined in accordance with geographic code references such as the Federal Information Processing Standard (FIPS), ZIP codes, the National Weather Service Specific Area Message Encoding (SAME) codes, and/or the Geographic Information System (GIS) Alert Mapping Service. For example, the enterprise alert server 34 could provide (at step 16) to the enterprise alert database 36 a list of enterprise facilities to receive the enterprise related alert message. The enterprise alert database 36 could respond with a list of ZIP codes, or the like in which the enterprise facilities are located.

At step 20, the enterprise alert server 34 provides, to the emergency alert server 38, the enterprise related alert and the associated alert areas. The emergency alert server 38, at step 22, provides the enterprise related alert message and the associated alert areas to the broadcast server 40. At step 24, the broadcast server 40 provides, to the wireless broadcast network 42, the enterprise related alert message and an indication of the associated alert areas. For example, the broadcast server 40 can generate and provide a list of cellular sites corresponding to the received (at step 22) alert area, or alert areas. The wireless broadcast network 42 provides, at step 26, the enterprise related alert message to the radio network 44, 46. The radio network 44, 46 represents the cellular sites corresponding to the alert area, or alert areas. The radio network 44, 46, at step 28, broadcasts the enterprise alert message to the devices 48, 50, 52, 54. Upon receipt of the enterprise related alert message, each device 48, 50, 52, 54 compares the characteristics (e.g., enterprise name, enterprise location) of the enterprise related alert message to pre-configured characteristics stored in the respective device 48, 50, 52, 54. If the characteristics match, the enterprise related alert message is rendered via the respective mobile device. If the characteristics do not match, the enterprise related alert message is not rendered via the respective mobile device.

The devices 48, 50, 52, 54 are representative of any appropriate type of device that can be utilized to receive the broadcast enterprise related alert message. The devices 48, 50, 52, 54 can represent mobile devices. The devices 48, 50, 52, 54 also can represent non-mobile devices, such as devices fixed in homes to receive enterprise related alert messages. The devices 48, 50, 52, 54 can comprise any combination of any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

Figure 2:
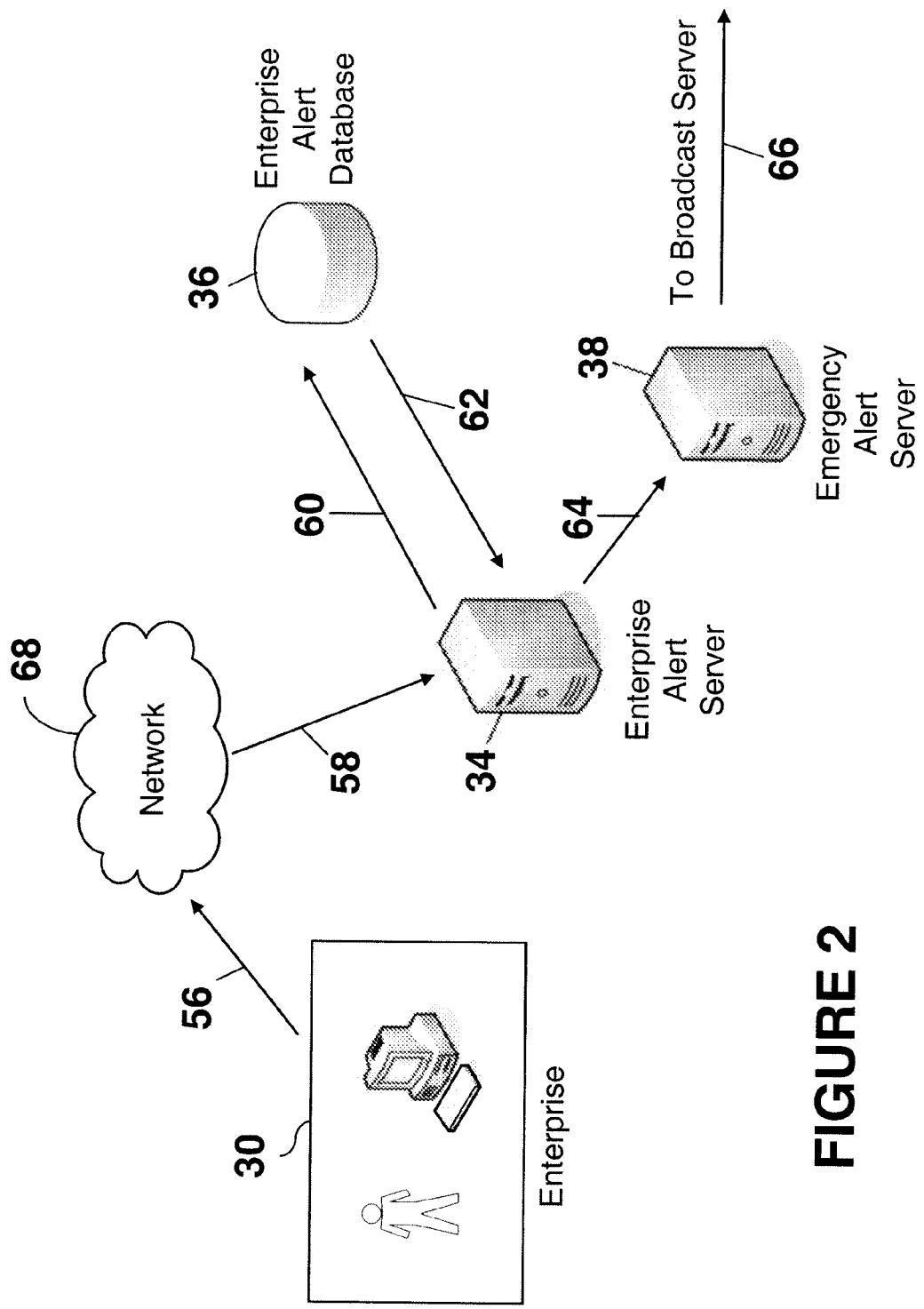
FIG. 2 is a flow diagram of an example system and process for manually initiating an enterprise related alert.

As described above, the enterprise related alert message can be initiated by the enterprise manually, semi-automatically, automatically, or a combination thereof. FIG. 2 is a flow diagram of an example system and process for manually initiating an enterprise related alert. Initially, an appropriate entity at the enterprise 30 determines that an enterprise related alert is to be sent. The appropriate entity can comprise an individual or group authorized to make the determination that an enterprise related alert message can be sent. The appropriate entity provides, at step 56, an enterprise related alert request to the network 68. The appropriate entity can provide the enterprise related alert request via any appropriate device, such as a mobile device, a desktop PC, a PDA, or the like. The network 68 can comprise any appropriate network such as a wired network and/or a wireless network, for example. The network provides, at step 58, an indication of the enterprise related alert request to the enterprise alert server 34. The enterprise alert server 34 can be separate from the enterprise 30, the enterprise alert server 34 can by located on the premises of the enterprise 30, or a combination thereof (e.g., a distributed system having portions on the premises and portions off the premises).

At step 60, the enterprise alert server 34 requests from the enterprise alert database 36 information pertaining to the enterprise related alert. In an example embodiment, the enterprise related alert request comprises information pertaining to the enterprise and the type of alert. For example, the enterprise related alert request can comprise an indication that the entity initiating the request is authorized (e.g., initiating entity credentials), an identification of the enterprise (e.g., name of enterprise), an indication of the location, or locations, of the enterprise facility, or facilities (e.g., enterprise facility location identifier, ZIP code), and an indication of the enterprise related alert type (e.g., school lock-down, early school closure, second shift cancelled return to home). Optionally, the enterprise related alert can comprise the text of the alert message and/or an indication that a predefined alert message is to be utilized. Also, the enterprise related alert optionally can comprise an indication of the alert areas or groups to which the enterprise related alert message is to be provided, and/or an indication that the enterprise related alert message is to be provided to predetermined alert areas. Information pertaining to the enterprise related alert also can comprise pre-defined enterprise alert information such as enterprise entity credential information, enterprise credential information, pre-defined enterprise alert message text, and/or pre-defined alerting areas, or the like.

At step 62, in response to the request (step 60), the enterprise alert database 36 provides associated enterprise related alert information. Using the credentialing information provided by the enterprise alert database 36 (step 62) and the requesting entity at the enterprise 30 (received at step 58), the enterprise alert server 34 determines if the request from the entity of the enterprise 30 is authorized. More specifically, the enterprise alert server 34 validates that the enterprise related alert request (received at step 58) is an authorized request and that the source of the request is authorized. If the request and source are authorized (e.g., credentials match), the enterprise alert server 34 generates the enterprise alert message utilizing the information received at step 58 and at step 62. If the request and source are not authorized (e.g., credentials do not match), the emergency alert server 38 does not generate the enterprise related alert message. At step 64, the enterprise alert server 34 provides the enterprise related alert message to the emergency alert server 38 for delivery to the indicated alert areas. At step 66, the emergency alert server 38 provides the enterprise related alert message and the indication of the alert areas to the broadcast server, and the process proceeds similarly as described above with respect to FIG. 1.

Figure 3:
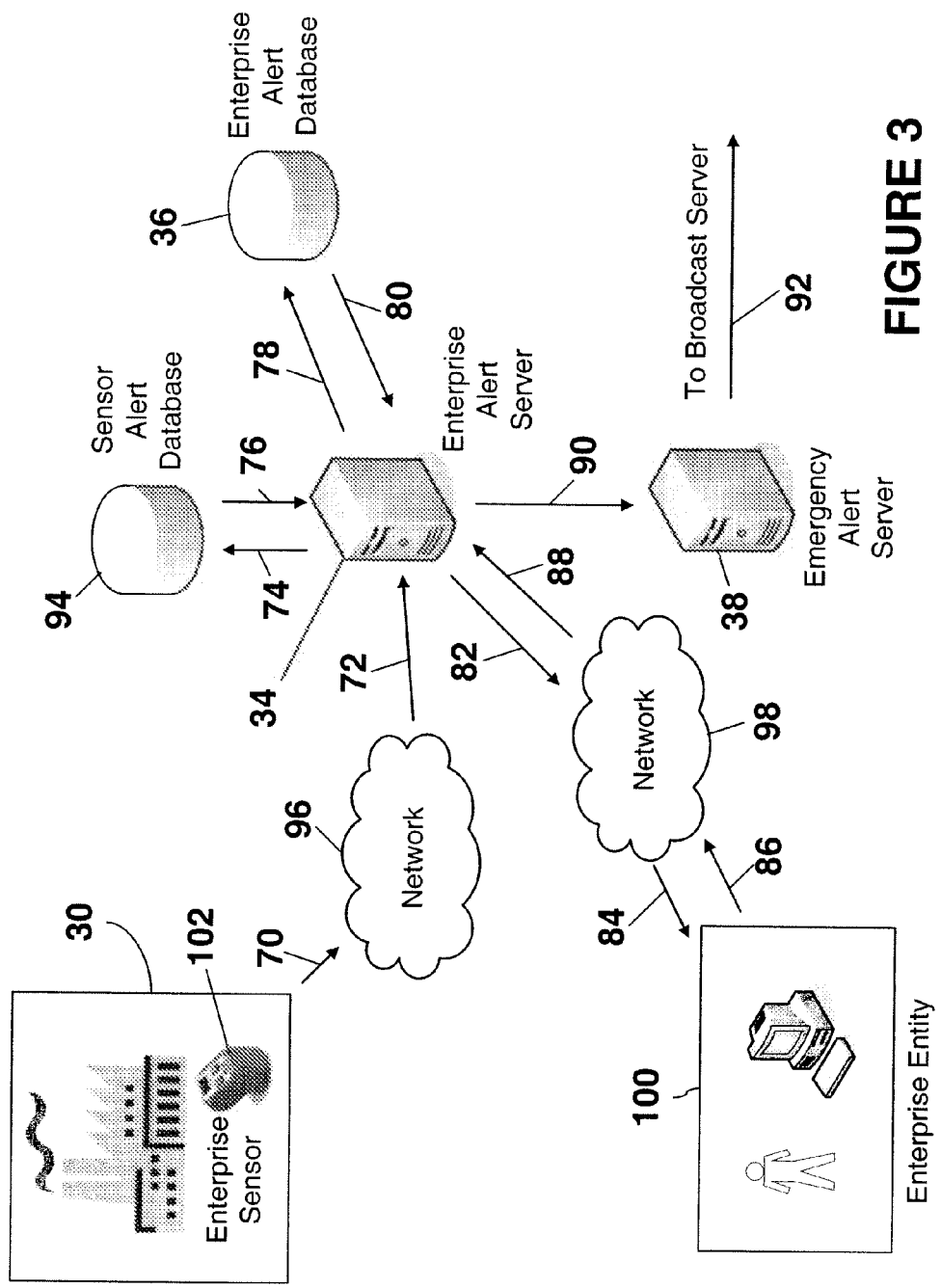
FIG. 3 is a flow diagram of an example system and process for semi-automatically initiating an enterprise related alert.

FIG. 3 is a flow diagram of an example system and process for semi-automatically initiating an enterprise related alert. A sensor 102 at the enterprise facility 30 detects a condition that can result in the issuance of an enterprise related alert message. The sensor 102 can comprise any appropriate sensor, such as an optical sensor, an acoustic sensor, a mechanical sensor, a gravitational sensor, a gyroscopic sensor, a heat detector, a smoke detector, or the like, for example. Information indicative of the sensor's 102 detection is provided, at step 70, to the network 96. The network 96 can comprise any appropriate network such as a wired network and/or a wireless network, for example. At step 72, information indicative of the sensor's 102 detection is provided to the enterprise alert server 34 by the network 96. The enterprise alert server 34 can be separate from the enterprise 30, the enterprise alert server 34 can by located on the premises of the enterprise 30, or a combination thereof (e.g., a distributed system having portions on the premises and portions off the premises).

At step 74, the enterprise alert server 34 provides a request for sensor alert information to the sensor alert database 94. In an example embodiment, the request for sensor alert information comprises an indication of the type of sensor 102, the minimum number of sensor detections reported before an enterprise related alert can be issued, the maximum time interval within which the minimum number of reported sensor detections can occur before an enterprise related alert can be issued, associated enterprise alert message identification information (e.g., information utilized to access enterprise 30 associated entries in the enterprise alert database 94), and indication that manual authorization of an enterprise related alert is requested or not requested, an identification of the enterprise 30 (e.g., name of enterprise), an indication of the location, or locations, of the enterprise 30 facility, or facilities (e.g., enterprise facility location identifier, ZIP code), and an indication of the enterprise related alert type (e.g., building "X" closed, do not report to work, only department "Y" should report to work, only employees in building "Z" should report to work and all others should return home). In this scenario (i.e., semi-automatic initiation of the enterprise related emergency alert), the request sent at step 74 includes an indication that manual authorization of an enterprise related alert is requested.

At step 76, in response to the request (at step 74), the sensor alert database 94 provides associated sensor related alert information to the enterprise alert server 34. The enterprise alert server 34 analyzes the information received from the sensor alert database 94 to determine if issuance of an enterprise related alert is warranted. If the enterprise alert server 34 determines that the number of sensor detections reported is equal to or greater than the minimum number of sensor detections (e.g., four sensor detections) needed before an enterprise related alert can be issued, and that the number of sensor detections reported occurred within the maximum time interval (e.g., 20 minutes) within which the minimum number of reported sensor detections can occur before an enterprise related alert can be issued, the enterprise alert server 34 proceeds to step 78. If the enterprise alert server 34 determines that the number of sensor detections reported is not equal to or greater than the minimum number of sensor detections needed before an enterprise related alert can be issued, or that the number of sensor detections reported did not occur within the maximum time interval within which the minimum number of reported sensor detections can occur before an enterprise related alert can be issued, the enterprise alert server 34 does not proceed to step 78.

At step 78, the enterprise alert server 34 requests from the enterprise alert database 36 information pertaining to the predefined alert message and the predefined alert areas. In response to the request (received at step 78), at step 80, the enterprise alert database 36, provides to the enterprise alert server 34, information associated with predefined alert message and the predefined alert areas. Information associated with predefined alert message and the predefined alert areas can comprise, for example, the message text and an indication of the areas in which the enterprise related alert message is to be broadcast.

The enterprise alert server 34 generates the enterprise related alert message in accordance with the information received at step 76 and at step 80. At step 82, the enterprise alert server 34 provides, to the network 98, the enterprise related alert message and an indication of the alert areas. The network 98 can comprise any appropriate network, such as a wired network and/or a wireless network, for example. At step 84, the network 98 provides the enterprise related alert message and an indication of the alert areas to an enterprise entity 100 for review and authorization. The enterprise entity 100 can comprise an individual or group authorized to make the determination that an enterprise related alert message can be sent (is authorized). The enterprise entity 100 can review the enterprise related alert message and proposed alert areas (received at step 84). The enterprise entity 100 also has the opportunity to approve or deny the issuance of the enterprise related alert message. If the enterprise entity 100 decides to issue the enterprise related alert message, the enterprise entity 100 is provided the ability to modify the enterprise related alert message and/or the alert areas prior to approving the release of the enterprise related alert message.

If the enterprise entity 100 decides to issue the enterprise related alert message (modified or not modified), the enterprise related alert message and an indication of the alert areas are provided, at step 86, to the network 98. At step 88, the network 98 provides to the enterprise alert server 34 the enterprise related alert message and the indication of the alert areas. The enterprise alert server 34 provides, at step 90, the enterprise related alert message and the indication of the alert areas to the emergency alert server 38. At step 92, the emergency alert server 38 provides the enterprise related alert message and the indication of alert areas to the broadcast server, and the process proceeds similarly as described above with respect to FIG. 1.

Figure 4:
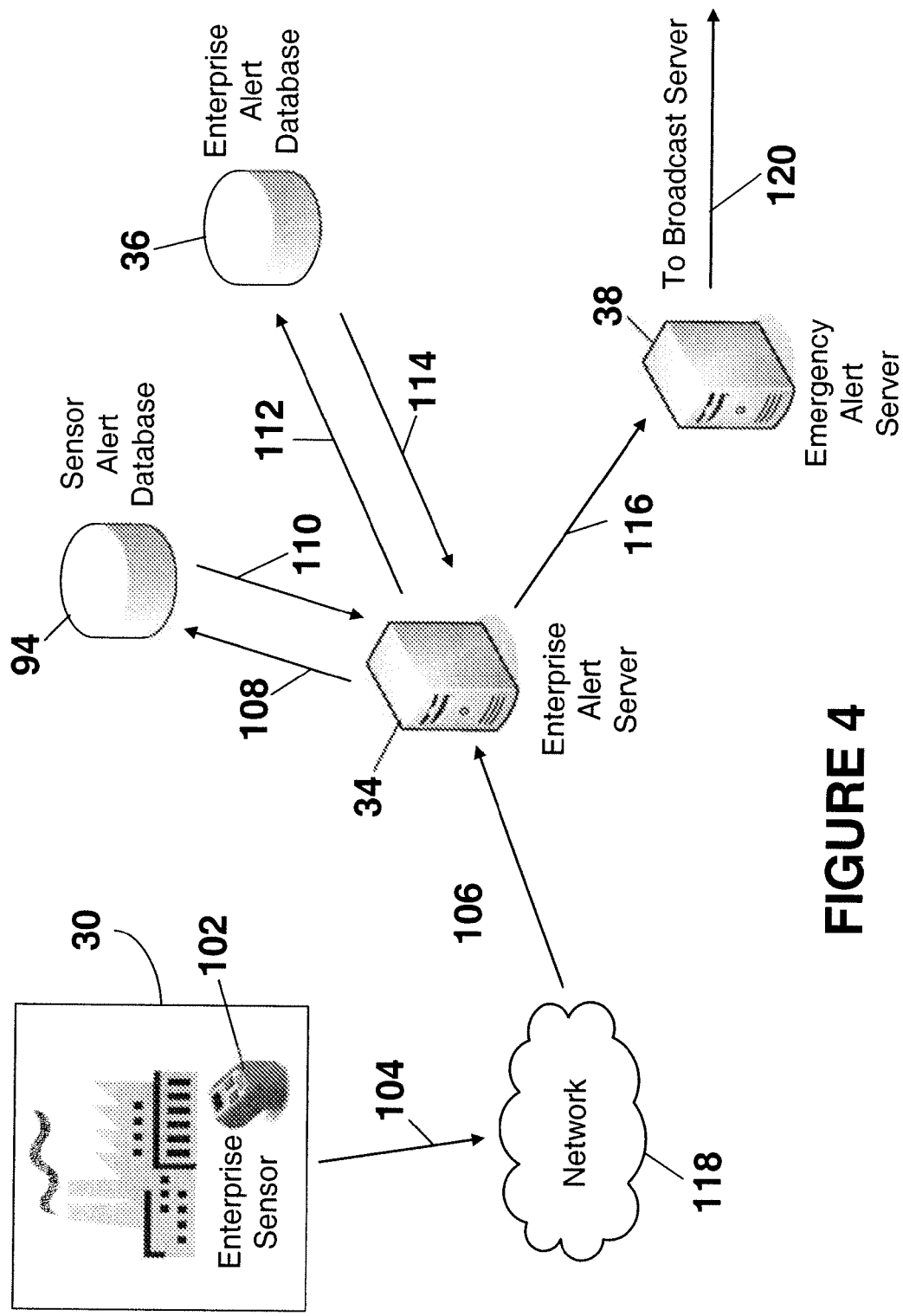
FIG. 4 is a flow diagram of an example system and process for automatically initiating an enterprise related alert.

FIG. 4 is a flow diagram of an example system and process for automatically initiating an enterprise related alert. A sensor 102 at the enterprise facility 30 detects a condition that can result in the issuance of an enterprise related alert message. Information indicative of the sensor's 102 detection is provided, at step 104, to the network 118. The network 118 can comprise any appropriate network such as a wired network and/or a wireless network, for example. At step 106, information indicative of the sensor's 102 detection is provided to the enterprise alert server 34 by the network 118. The enterprise alert server 34 can be separate from the enterprise 30, the enterprise alert server 34 can by located on the premises of the enterprise 30, or a combination thereof (e.g., a distributed system having portions on the premises and portions off the premises).

At step 108, the enterprise alert server 34 provides a request for sensor alert information to the sensor alert database 94. In an example embodiment, the request for sensor alert information comprises an indication of the type of sensor 102, the minimum number of sensor detections reported before an enterprise related alert can be issued, the maximum time interval within which the minimum number of reported sensor detections can occur before an enterprise related alert can be issued, associated enterprise alert message identification information (e.g., information utilized to access enterprise 30 associated entries in the enterprise alert database 94), and indication that manual authorization of an enterprise related alert is requested or not requested, an identification of the enterprise 30 (e.g., name of enterprise), an indication of the location, or locations, of the enterprise 30 facility, or facilities (e.g., enterprise facility location identifier, ZIP code), and an indication of the enterprise related alert type (e.g., facility issues at plant—Do not report to work). In this scenario (i.e., automatic initiation of the enterprise related emergency alert), the request sent at step 108 includes an indication that manual authorization of an enterprise related alert is not requested.

At step 110, in response to the request (at step 108), the sensor alert database 94 provides associated sensor related alert information to the enterprise alert server 34. The enterprise alert server 34 analyzes the information received from the sensor alert database 94 to determine if issuance of an enterprise related alert is warranted. If the enterprise alert server 34 determines that the number of sensor detections reported is equal to or greater than the minimum number of sensor detections needed before an enterprise related alert can be issued, and that the number of sensor detections reported occurred within the maximum time interval within which the minimum number of reported sensor detections can occur before an enterprise related alert can be issued, the enterprise alert server 34 proceeds to step 112. If the enterprise alert server 34 determines that the number of sensor detections reported is not equal to or greater than the minimum number of sensor detections needed before an enterprise related alert can be issued, or that the number of sensor detections reported did not occur within the maximum time interval within which the minimum number of reported sensor detections can occur before an enterprise related alert can be issued, the enterprise alert server 34 does not proceed to step 112.

At step 112, the enterprise alert server 34 requests from the enterprise alert database 36 information pertaining to the predefined alert message and the predefined alert areas. In response to the request (received at step 112), at step 114, the enterprise alert database 36, provides to the enterprise alert server 34, information associated with predefined alert message and the predefined alert areas. Information associated with predefined alert message and the predefined alert areas can comprise, for example, the message text and an indication of the areas in which the enterprise related alert message is to be broadcast.

The enterprise alert server 34 generates the enterprise related alert message in accordance with the information received at step 110 and at step 114. The enterprise alert server 34 provides, at step 116, the enterprise related alert message and the indication of the alert areas to the emergency alert server 38. At step 120, the emergency alert server 38 provides the enterprise related alert message and the indication of alert areas to the broadcast server, and the process proceeds similarly as described above with respect to FIG. 1.

Each of the enterprise alert server 34, the emergency alert server 38, and the broadcast server 40 can comprise any appropriate type of processor. The enterprise alert server 34, the emergency alert server 38, and the broadcast server 40 can each be implemented in separate processors, in a single processor, or a combination thereof. Further, each processor can be implemented as a single processor or multiple processors. Multiple processors can be distributed or centrally located. Multiple processors can communicate wirelessly, via hard wire, or a combination thereof. Examples processors include mobile communications devices, mobile telephones, personal digital assistants (PDAs), lap top computers, handheld processors, or a combination thereof.

Each of the enterprise alert database 36 and the sensor alert database 94 comprise any appropriate type of database. The enterprise alert database 36 and the sensor alert database 94 can each be implemented in separate databases, in a single database, or a combination thereof. Further, each database can be implemented as a single database or multiple databases. Multiple databases can be distributed or centrally located. Multiple databases can communicate wirelessly, via hard wire, or a combination thereof. Further the enterprise alert database 36, the sensor alert database 94, the enterprise alert server 34, the emergency alert server 38, and the broadcast server 40 can be implemented in any combination.

The following description sets forth some exemplary telephony radio networks and non-limiting operating environments for distributing enterprise related alert messages via the EAS. The below-described operating environments should be considered non-exhaustive, however, and thus the below-described network architectures merely show how distributing enterprise related alert messages via the EAS may be incorporated into existing network structures and architectures. It can be appreciated, however, that distributing enterprise related alert messages via the EAS can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3 G services, such as Universal Mobile Telephone System ("UMTS"), Frequency Division Duplexing ("FDD") and Time Division Duplexing ("TDD"), High Speed Packet Data Access ("HSPDA"), cdma2000 1xEvolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of distributing enterprise related alert messages via the EAS can be applied independently of the method of data transport, and do not depend on any particular network architecture, or underlying protocols.

Figure 5:
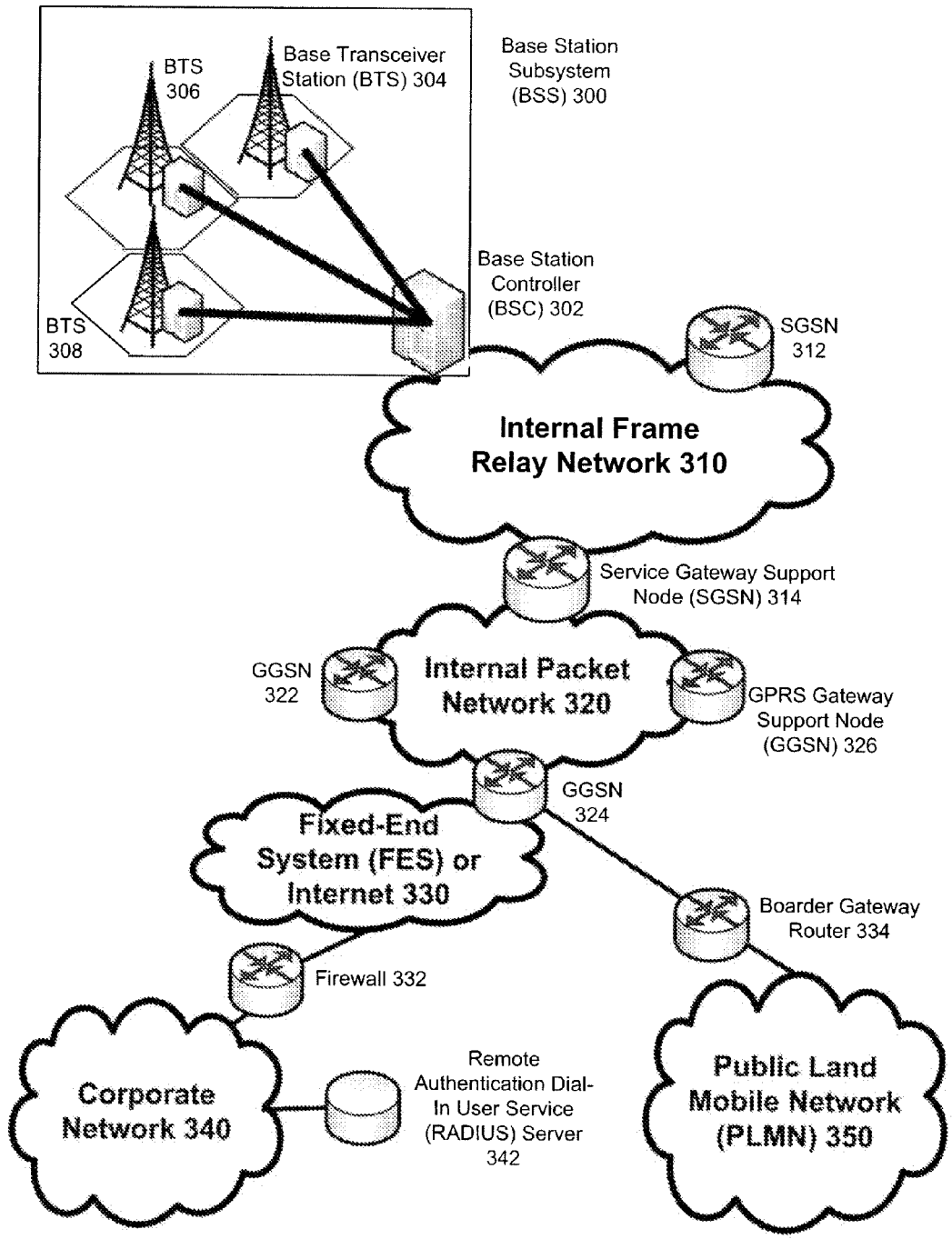
FIG. 5 depicts an overall block diagram of an exemplary packet-based mobile cellular network environment, such as a GPRS network, in which the system for distributing enterprise alerts via the EAS can be practiced.

FIG. 5 depicts an overall block diagram of an exemplary packet-based mobile cellular network environment, such as a GPRS network, in which the system for distributing enterprise related alert messages via the EAS can be practiced. In an example configuration, the network 32, the network 42, the radio network 44, the radio network 46, the network 68, the network 96, the network 98, and the network 118, individually or in any combination, are encompassed by the network environment depicted in FIG. 5. In such an environment, there are a plurality of Base Station Subsystems ("BSS") 300 (only one is shown), each of which comprises a Base Station Controller ("BSC") 302 serving a plurality of Base Transceiver Stations ("BTS") such as BTSs 304, 306, and 308. BTSs 304, 306, 308, etc. are the access points where users of packet-based mobile devices (e.g., portable device 48, 50, 52, 54) become connected to the wireless network. In exemplary fashion, the packet traffic originating from user devices (e.g., user device 30) is transported via an over-the-air interface to a BTS 308, and from the BTS 308 to the BSC 302. Base station subsystems, such as BSS 300, are a part of internal frame relay network 310 that can include Service GPRS Support Nodes ("SGSN") such as SGSN 312 and 314. Each SGSN is connected to an internal packet network 320 through which a SGSN 312, 314, etc. can route data packets to and from a plurality of gateway GPRS support nodes (GGSN) 322, 324, 326, etc. As illustrated, SGSN 314 and GGSNs 322, 324, and 326 are part of internal packet network 320. Gateway GPRS serving nodes 322, 324 and 326 mainly provide an interface to external Internet Protocol ("IP") networks such as Public Land Mobile Network ("PLMN") 350, corporate intranets 340, or Fixed-End System ("FES") or the public Internet 330. As illustrated, subscriber corporate network 340 may be connected to GGSN 324 via firewall 332; and PLMN 350 is connected to GGSN 324 via boarder gateway router 334. The Remote Authentication Dial-In User Service ("RADIUS") server 342 may be used for caller authentication when a user of a mobile cellular device calls corporate network 340.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 6:
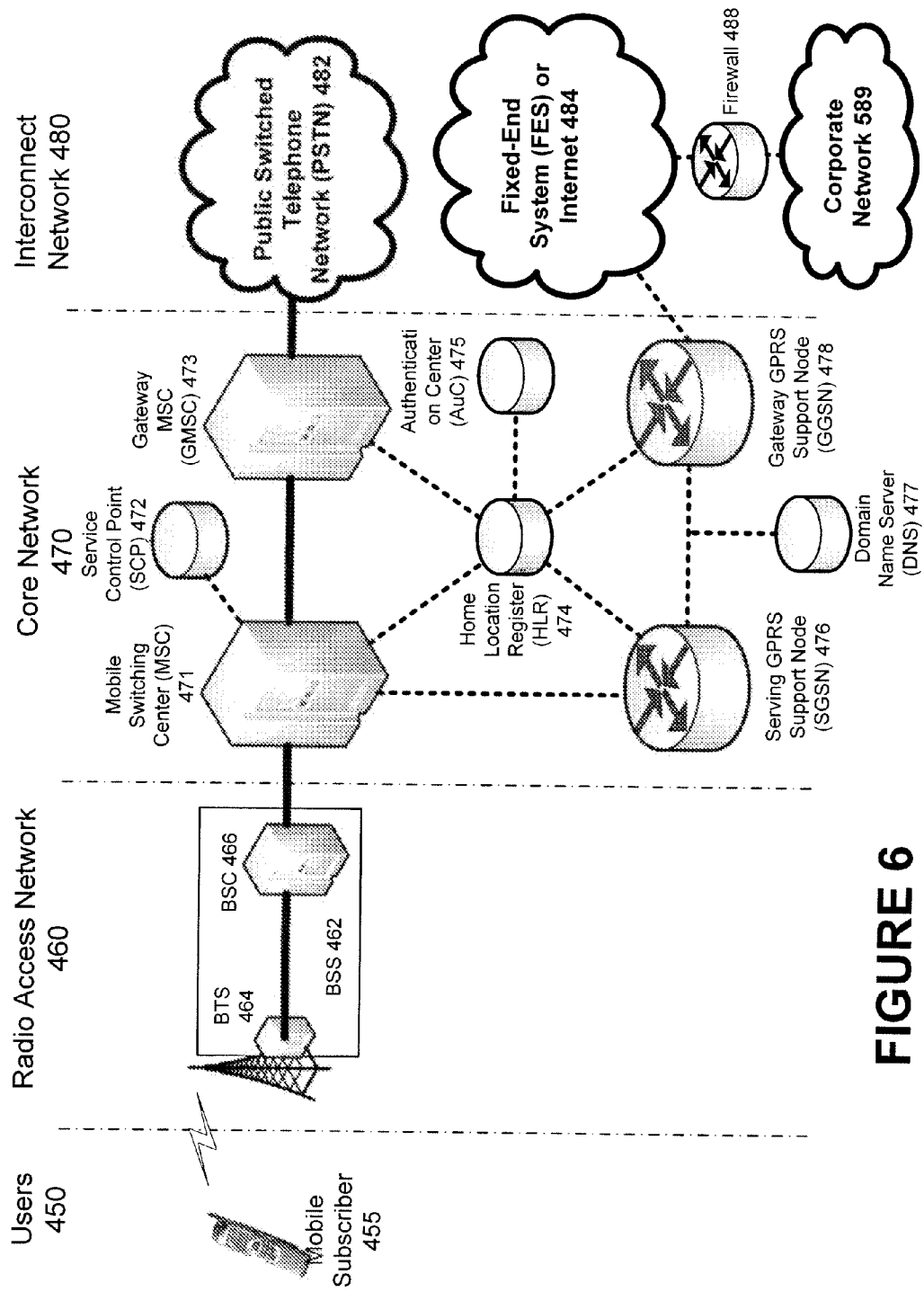
FIG. 6 illustrates an architecture of a typical GPRS network as segmented into four groups.

FIG. 6 illustrates an architecture of a typical GPRS network as segmented into four groups: users 450, radio access network 460, core network 470, and interconnect network 480. In an example configuration the wireless broadcast network 40 is encompassed by the radio access network 460, core network 470, and interconnect network 480. Users 450 comprise a plurality of end users (though only mobile subscriber 455 is shown in FIG. 6). In an example embodiment, the device depicted as mobile subscriber 455 comprises portable devices 48, 50, 52, 54. Radio access network 460 comprises a plurality of base station subsystems such as BSSs 462, which include BTSs 464 and BSCs 466. Core network 470 comprises a host of various network elements. As illustrated here, core network 470 may comprise Mobile Switching Center ("MSC") 471, Service Control Point ("SCP") 472, gateway MSC 473, SGSN 476, Home Location Register ("HLR") 474, Authentication Center ("AuC") 475, Domain Name Server ("DNS") 477, and GGSN 478. Interconnect network 480 also comprises a host of various networks and other network elements. As illustrated in FIG. 6, interconnect network 480 comprises Public Switched Telephone Network ("PSTN") 482, Fixed-End System ("FES") or Internet 484, firewall 488, and Corporate Network 489.

A mobile switching center can be connected to a large number of base station controllers. At MSC 471, for instance, depending on the type of traffic, the traffic may be separated in that voice may be sent to Public Switched Telephone Network ("PSTN") 482 through Gateway MSC ("GMSC") 473, and/or data may be sent to SGSN 476, which then sends the data traffic to GGSN 478 for further forwarding.

When MSC 471 receives call traffic, for example, from BSC 466, it sends a query to a database hosted by SCP 472. The SCP 472 processes the request and issues a response to MSC 471 so that it may continue call processing as appropriate.

The HLR 474 is a centralized database for users to register to the GPRS network. HLR 474 stores static information about the subscribers such as the International Mobile Subscriber Identity ("IMSI"), subscribed services, and a key for authenticating the subscriber. HLR 474 also stores dynamic subscriber information such as the current location of the mobile subscriber. Associated with HLR 474 is AuC 475. AuC 475 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the portable devices 48, 50, 52, 54, used by an end user of the mobile cellular service. When a mobile subscriber turns on his or her mobile device, the mobile device goes through an attach process by which the mobile device attaches to an SGSN of the GPRS network. In FIG. 6, when mobile subscriber 455 initiates the attach process by turning on the network capabilities of the mobile device, an attach request is sent by mobile subscriber 455 to SGSN 476. The SGSN 476 queries another SGSN, to which mobile subscriber 455 was attached before, for the identity of mobile subscriber 455. Upon receiving the identity of mobile subscriber 455 from the other SGSN, SGSN 476 requests more information from mobile subscriber 455. This information is used to authenticate mobile subscriber 455 to SGSN 476 by HLR 474. Once verified, SGSN 476 sends a location update to HLR 474 indicating the change of location to a new SGSN, in this case SGSN 476. HLR 474 notifies the old SGSN, to which mobile subscriber 455 was attached before, to cancel the location process for mobile subscriber 455. HLR 474 then notifies SGSN 476 that the location update has been performed. At this time, SGSN 476 sends an Attach Accept message to mobile subscriber 455, which in turn sends an Attach Complete message to SGSN 476.

After attaching itself with the network, mobile subscriber 455 then goes through the authentication process. In the authentication process, SGSN 476 sends the authentication information to HLR 474, which sends information back to SGSN 476 based on the user profile that was part of the user's initial setup. The SGSN 476 then sends a request for authentication and ciphering to mobile subscriber 455. The mobile subscriber 455 uses an algorithm to send the user identification (ID) and password to SGSN 476. The SGSN 476 uses the same algorithm and compares the result. If a match occurs, SGSN 476 authenticates mobile subscriber 455.

Next, the mobile subscriber 455 establishes a user session with the destination network, corporate network 489, by going through a Packet Data Protocol ("PDP") activation process. Briefly, in the process, mobile subscriber 455 requests access to the Access Point Name ("APN"), for example, UPS.com (e.g., which can be corporate network 489 in FIG. 6) and SGSN 476 receives the activation request from mobile subscriber 455. SGSN 476 then initiates a Domain Name Service ("DNS") query to learn which GGSN node has access to the UPS.com APN. The DNS query is sent to the DNS server within the core network 470, such as DNS 477, which is provisioned to map to one or more GGSN nodes in the core network 470. Based on the APN, the mapped GGSN 478 can access the requested corporate network 489. The SGSN 476 then sends to GGSN 478 a Create Packet Data Protocol ("PDP") Context Request message that contains necessary information. The GGSN 478 sends a Create PDP Context Response message to SGSN 476, which then sends an Activate PDP Context Accept message to mobile subscriber 455.

Once activated, data packets of the call made by mobile subscriber 455 can then go through radio access network 460, core network 470, and interconnect network 480, in a particular fixed-end system or Internet 484 and firewall 488, to reach corporate network 489.

Thus, network elements that can invoke the functionality of selectively processing and EAS message can include but are not limited to Gateway GPRS Support Node tables, Fixed End System router tables, firewall systems, VPN tunnels, and any number of other network elements as required by the particular digital network.

Figure 7:
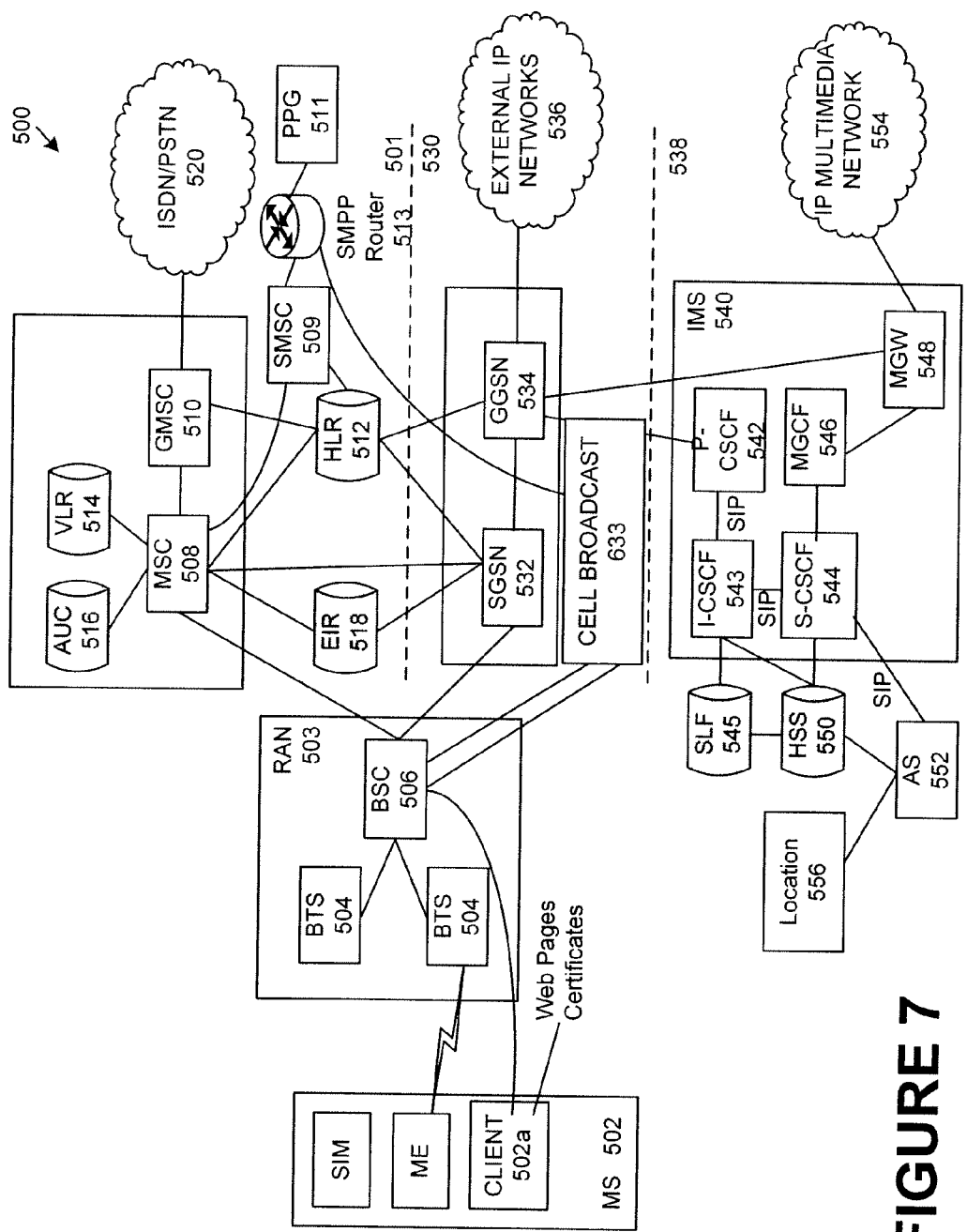
FIG. 7 illustrates an example alternate block diagram of an exemplary GSM/GPRS/IP multimedia network architecture in which distribution of enterprise alerts via the EAS can be accomplished.

FIG. 7 illustrates another exemplary block diagram view of a GSM/GPRS/IP multimedia network architecture 500 in which distributing enterprise related alert messages via the EAS can be incorporated. In an example embodiment, the wireless network 40 and the IP network 34 are encompassed by the network architecture 500. As illustrated, architecture 500 of FIG. 7 includes a GSM core network 501, a GPRS network 530 and an IP multimedia network 538. The GSM core network 501 includes a Mobile Station (MS) 502, at least one Base Transceiver Station (BTS) 504 and a Base Station Controller (BSC) 506. The MS 502 is physical equipment or Mobile Equipment (ME), such as a mobile phone or a laptop computer (e.g., portable device 48, 50, 52, 54) that is used by mobile subscribers, with a Subscriber identity Module (SIM). The SIM includes an International Mobile Subscriber Identity (IMSI), which is a unique identifier of a subscriber. The BTS 504 is physical equipment, such as a radio tower, that enables a radio interface to communicate with the MS. Each BTS may serve more than one MS. The BSC 506 manages radio resources, including the BTS. The BSC may be connected to several BTSs. The BSC and BTS components, in combination, are generally referred to as a base station (BSS) or radio access network (RAN) 503.

The GSM core network 501 also includes a Mobile Switching Center (MSC) 508, a Gateway Mobile Switching Center (GMSC) 510, a Home Location Register (HLR) 512, Visitor Location Register (VLR) 514, an Authentication Center (AuC) 518, and an Equipment Identity Register (EIR) 516. The MSC 508 performs a switching function for the network. The MSC also performs other functions, such as registration, authentication, location updating, handovers, and call routing. The GMSC 510 provides a gateway between the GSM network and other networks, such as an Integrated Services Digital Network (ISDN) or Public Switched Telephone Networks (PSTNs) 520. Thus, the GMSC 510 provides interworking functionality with external networks.

The HLR 512 is a database that contains administrative information regarding each subscriber registered in a corresponding GSM network. The HLR 512 also contains the current location of each MS. The VLR 514 is a database that contains selected administrative information from the HLR 512. The VLR contains information necessary for call control and provision of subscribed services for each MS currently located in a geographical area controlled by the VLR. The HLR 512 and the VLR 514, together with the MSC 508, provide the call routing and roaming capabilities of GSM. The AuC 516 provides the parameters needed for authentication and encryption functions. Such parameters allow verification of a subscriber's identity. The EIR 518 stores security-sensitive information about the mobile equipment.

A Short Message Service Center (SMSC) 509 allows one-to-one Short Message Service (SMS) messages to be sent to/from the MS 502. A Push Proxy Gateway (PPG) 511 is used to "push" (i.e., send without a synchronous request) content to the MS 502. The PPG 511 acts as a proxy between wired and wireless networks to facilitate pushing of data to the MS 502. A Short Message Peer to Peer (SMPP) protocol router 513 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 502 sends a location update including its current location information to the MSC/VLR, via the BTS 504 and the BSC 506. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 530 is logically implemented on the GSM core network architecture by introducing two packet-switching network nodes, a serving GPRS support node (SGSN) 532, a cell broadcast and a Gateway GPRS support node (GGSN) 534. The SGSN 532 is at the same hierarchical level as the MSC 508 in the GSM network. The SGSN controls the connection between the GPRS network and the MS 502. The SGSN also keeps track of individual MS's locations and security functions and access controls.

A Cell Broadcast Center (CBC) 533 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 534 provides a gateway between the GPRS network and a public packet network (PDN) or other IP networks 536. That is, the GGSN provides interworking functionality with external networks, and sets up a logical link to the MS through the SGSN. When packet-switched data leaves the GPRS network, it is transferred to an external TCP-IP network 536, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 530 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 538 was introduced with 3GPP Release 5, and includes an IP multimedia subsystem (IMS) 540 to provide rich multimedia services to end users. A representative set of the network entities within the IMS 540 are a call/session control function (CSCF), a media gateway control function (MGCF) 546, a media gateway (MGW) 548, and a master subscriber database, called a home subscriber server (HSS) 550. The HSS 550 may be common to the GSM network 501, the GPRS network 530 as well as the IP multimedia network 538.

The IP multimedia system 540 is built around the call/session control function, of which there are three types: an interrogating CSCF (I-CSCF) 543, a proxy CSCF (P-CSCF) 542, and a serving CSCF (S-CSCF) 544. The P-CSCF 542 is the MS's first point of contact with the IMS 540. The P-CSCF 542 forwards session initiation protocol (SIP) messages received from the MS to an SIP server in a home network (and vice versa) of the MS. The P-CSCF 542 may also modify an outgoing request according to a set of rules defined by the network operator (for example, address analysis and potential modification).

The I-CSCF 543, forms an entrance to a home network and hides the inner topology of the home network from other networks and provides flexibility for selecting an S-CSCF. The I-CSCF 543 may contact a subscriber location function (SLF) 545 to determine which HSS 550 to use for the particular subscriber, if multiple HSS's 550 are present. The S-CSCF 544 performs the session control services for the MS 502. This includes routing originating sessions to external networks and routing terminating sessions to visited networks. The S-CSCF 544 also decides whether an application server (AS) 552 is required to receive information on an incoming SIP session request to ensure appropriate service handling. This decision is based on information received from the HSS 550 (or other sources, such as an application server 552). The AS 552 also communicates to a location server 556 (e.g., a Gateway Mobile Location Center (GMLC)) that provides a position (e.g., latitude/longitude coordinates) of the MS 502.

The HSS 550 contains a subscriber profile and keeps track of which core network node is currently handling the subscriber. It also supports subscriber authentication and authorization functions (AAA). In networks with more than one HSS 550, a subscriber location function provides information on the HSS 550 that contains the profile of a given subscriber.

The MGCF 546 provides interworking functionality between SIP session control signaling from the IMS 540 and ISUP/BICC call control signaling from the external GSTN networks (not shown). It also controls the media gateway (MGW) 548 that provides user-plane interworking functionality (e.g., converting between AMR- and PCM-coded voice). The MGW 548 also communicates with other IP multimedia networks 554.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of distributing enterprise related alert messages via the EAS have been described in connection with various computing devices, the underlying concepts can be applied to any computing device or system capable of distributing enterprise related alert messages via the EAS. The various techniques described herein can be implemented in connection with hardware or software or, where appropriate, with a combination of both. Thus, the methods and apparatus for distributing enterprise related alert messages via the EAS, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for distributing enterprise related alert messages via the EAS. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for distributing enterprise related alert messages via the EAS also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for selectively processing a broadcast message. When implemented on a general-purpose processor, the program code combines with the processor to provide a unique apparatus that operates to invoke the functionality of distributing enterprise related alert messages via the EAS. Additionally, any storage techniques used in connection with distributing enterprise related alert messages via the EAS can invariably be a combination of hardware and software.

While distributing enterprise related alert messages via the EAS has been described in connection with the various embodiments of the various figures, it is to be understood that other similar embodiments can be used or modifications and additions can be made to the described embodiment for performing the same function of distributing enterprise related alert messages via the EAS without deviating therefrom. For example, one skilled in the art will recognize that a system for distributing enterprise related alert messages via the EAS as described may apply to any environment, whether wired or wireless, and may be applied to any number of devices connected via a communications network and interacting across the network. Therefore, distributing enterprise related alert messages via the EAS should not be limited to any single embodiment, but rather should be construed in breadth and scope in accordance with the appended claims.

What is claimed is:

1. A processor-implemented method comprising:
   receiving an indication of an enterprise related alert;
   receiving an indication of at least one alert area in which to provide the indication of the enterprise related alert;
   analyzing the indication of the enterprise related alert to determine if distribution of the enterprise related alert message is warranted by
      determining a number of detections reported by a sensor; and
      determining a time interval in which the number of detections reported by the sensor occurred; and
   if the determined number of detections is equal to or greater than a first threshold of sensor detections and the determined time interval is less than or equal to a second threshold interval:
      generating, via the processor, the enterprise related alert message comprising enterprise specific information comprising an identification of an enterprise and an indication of an alert type, wherein:
         the enterprise related alert message is formatted for compliance with the Emergency Alert System; and
         providing the enterprise related alert message for broadcast using the Emergency Alert System to the at least one alert area.

2. The method in accordance with claim 1, wherein the enterprise comprises at least one of a company, a business, a firm, a school, a corporation, a department of transportation, a law enforcement agency, or a commuter service.

3. The method in accordance with claim 1, wherein the enterprise specific information further comprises at least one of an enterprise name or an enterprise facility location identifier.

4. The method in accordance with claim 1, wherein the alert type is indicative of an effect upon operations of the enterprise.

5. The method in accordance with claim 1, further comprising broadcasting the enterprise related alert message via at least one cellular site covering at least one of the at least one alert area.

6. The method in accordance with claim 1, wherein the indication of the enterprise related alert is initiated manually by an entity of the enterprise.

7. The method in accordance with claim 1, wherein the indication of the enterprise related alert is automatically initiated via the sensor at the enterprise.

8. The method in accordance with claim 1, wherein:
   the indication of the enterprise related alert is initiated via the sensor at the enterprise; and
   the enterprise related alert message is authorized by an entity of the enterprise prior to providing the enterprise related alert message for broadcast to the at least one alert area.

9. The method in accordance with claim 8, wherein the indication of the enterprise related alert is initiated via the sensor at the enterprise, the method further comprising:
   determining if authorization is required prior to generating the enterprise related alert message; and
   if authorization is required, obtaining the authorization prior to generating the enterprise related alert message.

10. A system comprising:
   memory comprising at least one executable instruction; and
   a processor coupled to the memory, the processor configured to execute the at least one executable instruction to:
      receive an indication of an enterprise related alert;
      receive an indication of at least one alert area in which to provide the indication of the enterprise related alert;
      analyze the indication of the enterprise related alert to determine if distribution of an enterprise related alert message is warranted by:

determining a number of detections reported by a sensor; and determining a time interval in which the number of detections reported by the sensor occurred; and if the determined number of detections is equal to or greater than a first threshold of sensor detections and the determined time interval is less than or equal to a second threshold interval:

generate the enterprise related alert message comprising enterprise specific information comprising an identification of the enterprise and an indication of an alert type, wherein:

the enterprise related alert message is formatted for compliance with an Emergency Alert System; and provide the enterprise related alert message for broadcast using the Emergency Alert System to the at least one alert area.

11. The system in accordance with claim 10, wherein the enterprise comprises at least one of a company, a business, or a firm, a school, a corporation, a department of transportation, a law enforcement agency, or a commuter service.

12. The system in accordance with claim 10, wherein the enterprise specific information further comprises at least one of an enterprise name or an enterprise facility location identifier.

13. The system in accordance with claim 10, wherein the enterprise alert type is indicative of an effect upon operations of the enterprise.

14. The system in accordance with claim 10, further comprising at least one radio network configured to broadcast the enterprise related alert message via at least one cellular cite covering at least one of the at least one alert area.

15. The system in accordance with claim 10, wherein the indication of the enterprise related alert is initiated manually by an entity of the enterprise.

16. The system in accordance with claim 10, wherein the indication of the enterprise related alert is automatically initiated via sensor at the enterprise.

17. The system in accordance with claim 10, wherein:

the indication of the enterprise related alert is automatically initiated via sensor at the enterprise; and the enterprise related alert message is authorized by an entity of the enterprise prior to providing the enterprise related alert message for broadcast to the at least one alert area.

18. The system in accordance with claim 17, wherein the indication of the enterprise related alert is automatically initiated via the sensor at the enterprise, the system further comprising:

a database, wherein the at least one server is configured to:

query the database to determine if authorization is required prior to generating the enterprise related alert message; and if authorization is required, the obtain the authorization prior to generating the enterprise related alert message.

* * * * *

UNITED STATES PATENT AND TRADEMARK OFFICE
CERTIFICATE OF CORRECTION

| | | |
|---|---|---|
| PATENT NO. | : 8,285,694 B1 | Page 1 of 1 |
| APPLICATION NO. | : 11/624508 | |
| DATED | : October 9, 2012 | |
| INVENTOR(S) | : Brian Kevin Daly et al. | |

It is certified that error appears in the above-identified patent and that said Letters Patent is hereby corrected as shown below:

In the Claims:
Column 18,
Line 3, delete "cite" and insert -- site --.

Signed and Sealed this
Twenty-third Day of April, 2013

Teresa Stanek Rea
*Acting Director of the United States Patent and Trademark Office*